United States Patent
Yamashita et al.

(10) Patent No.: US 9,062,621 B2
(45) Date of Patent: Jun. 23, 2015

(54) FUEL CONTROL METHOD FOR HANDHELD ENGINE OPERATING MACHINE

(71) Applicants: IIDA DENKI KOGYO CO., LTD., Mitaka-shi, Tokyo (JP); ZAMA JAPAN CO., LTD., Hachimantai-shi, Iwate (JP)

(72) Inventors: Ryouhei Yamashita, Tokyo (JP); Akira Yamazaki, Tokyo (JP); Tamotsu Saitou, Hachimantai (JP); Hideki Watanabe, Hachimantai (JP); Takumi Nonaka, Hachimantai (JP)

(73) Assignees: IIDA DENKI KOGYO CO., LTD., Tokyo (JP); ZAMA JAPAN CO., LTD., Iwate (JP)

( * ) Notice: Subject to any disclaimer, the term of this patent is extended or adjusted under 35 U.S.C. 154(b) by 425 days.

(21) Appl. No.: 13/661,664

(22) Filed: Oct. 26, 2012

(65) Prior Publication Data
US 2013/0112170 A1    May 9, 2013

(30) Foreign Application Priority Data
Nov. 4, 2011    (JP) .................................. 2011-242202

(51) Int. Cl.
F02D 41/24 (2006.01)
F02D 41/00 (2006.01)
F02D 41/08 (2006.01)

(52) U.S. Cl.
CPC ............ F02D 41/0002 (2013.01); F02D 41/08 (2013.01); F02D 2400/06 (2013.01); Y02T 10/42 (2013.01)

(58) Field of Classification Search
CPC ... F02D 41/08; F02D 41/0002; F02D 41/123; F02D 2041/001; B60W 10/06; B60W 10/08; B60W 20/00
USPC ................. 123/319, 330–334, 339.1, 339.11, 123/339.12, 339.19, 339.22, 439, 680, 685; 701/103, 104, 113
See application file for complete search history.

(56) References Cited

U.S. PATENT DOCUMENTS

| | | | | | |
|---|---|---|---|---|---|
| 5,697,337 | A | * | 12/1997 | Takahashi et al. | ....... 123/339.11 |
| 5,983,875 | A | * | 11/1999 | Kitagawa et al. | ............. 123/674 |
| 2002/0174852 | A1 | * | 11/2002 | Choi | ........................ 123/339.11 |
| 2003/0106304 | A1 | * | 6/2003 | Miyahara et al. | ............... 60/277 |
| 2003/0164155 | A1 | * | 9/2003 | Arakawa et al. | ......... 123/406.13 |

(Continued)

FOREIGN PATENT DOCUMENTS

JP    A-2011-12685    1/2011

*Primary Examiner* — John Kwon
*Assistant Examiner* — Johnny H Hoang
(74) *Attorney, Agent, or Firm* — Oliff PLC

(57) ABSTRACT

A method for making an optimum combustion during engine operating time changes a fuel flow rate of the solenoid valve on the basis of engine rotational speed feedback control during engine idling time at low engine rotational speed and low electric power consumption. During engine idling time of an engine are carried out a rotational speed detecting process, an idle rotation adjusting process of making a rotational speed detected by the rotational speed detecting process equal to an initial value of rotational speed by controlling an ignition timing while comparing the detected rotational speed with the initial value of rotational speed as target value, and a valve opening correction process according to idle ignition timing change (I.I.T.C.) obtained by the idle rotation adjusting process. The valve opening is set to an adjusted valve opening (A.V.O.) plus a correction valve opening (C.V.O.) by the valve opening correction process.

8 Claims, 6 Drawing Sheets

(56) References Cited

U.S. PATENT DOCUMENTS

2003/0221664 A1* 12/2003 Surnilla .................. 123/339.11
2004/0112331 A1* 6/2004 Miura ........................... 123/346
2008/0319633 A1* 12/2008 Moriya et al. ................ 701/103
2013/0047958 A1* 2/2013 Yamakawa et al. ...... 123/406.44

* cited by examiner

BASIC ENGINE OPERATION FLOW

Fig. 2
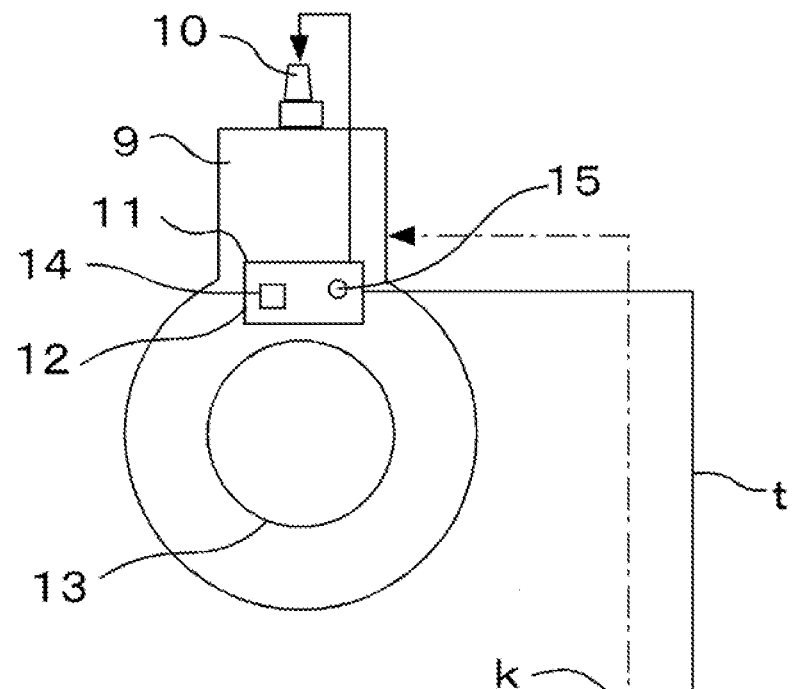
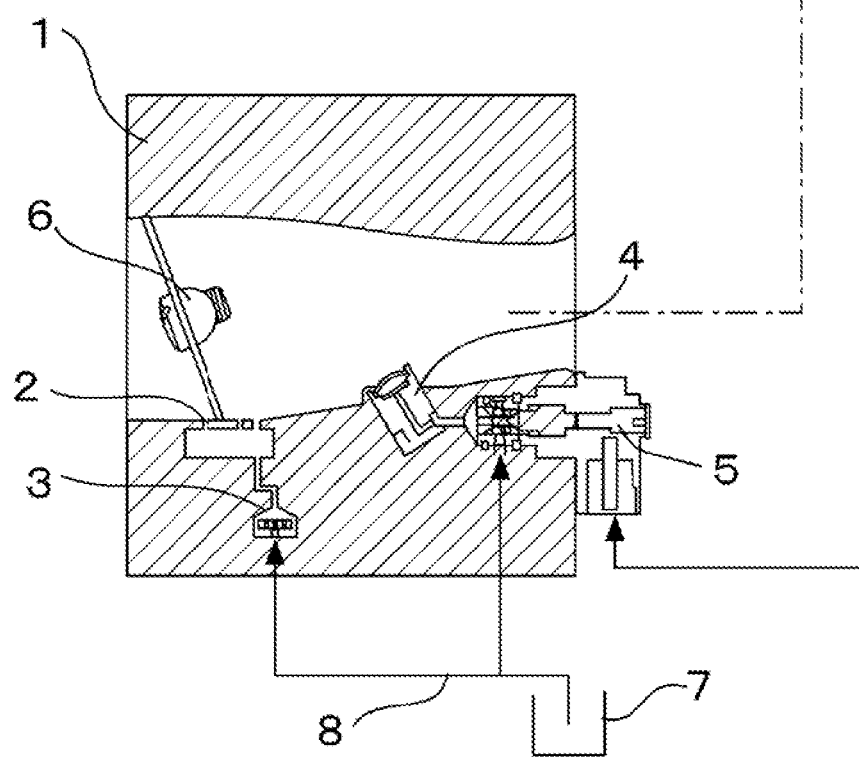

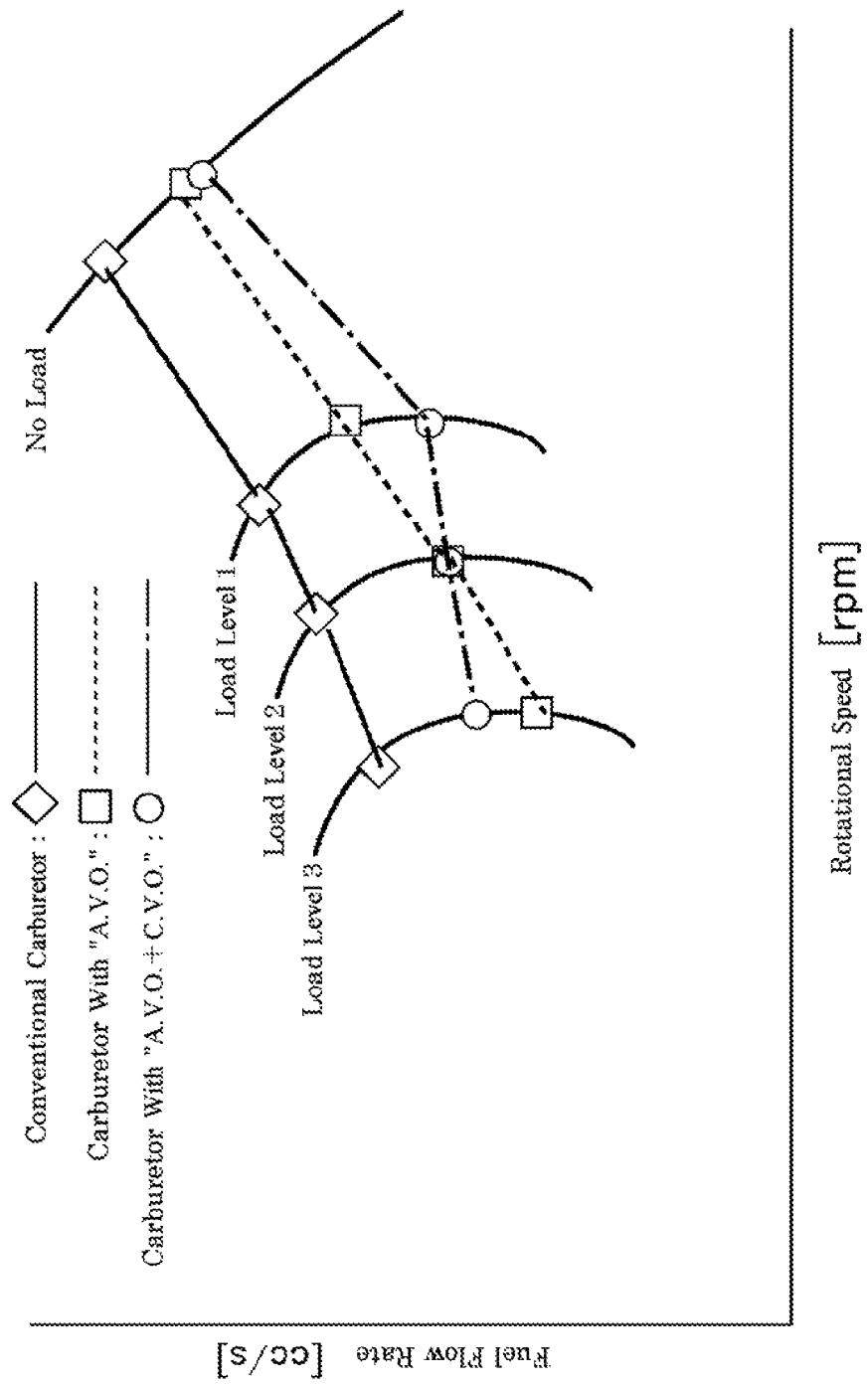

FUEL CONTROL METHOD FOR HANDHELD ENGINE OPERATING MACHINE

TECHNICAL FIELD

The present invention relates to a fuel control method for handheld engine operating machine such as a mower or a chainsaw.

BACKGROUND OF THE INVENTION

The handheld engine operating machines sold on the market are made to be capable of operate optimally in a shipping condition after the process of being adjusted so as to correct individual, parts deviations in carburetor and engine in the factory where the operating machines are manufactured.

Regardless of that adjustment, an optimum combustion of fuel in an engine is changed according to the effect of temperature, atmospheric pressure, type of fuel, brake-in of an engine, clogging of an air cleaner, and the like in using environment. In the result it often happens that it is impossible for the engine to maintain an optimum operating state, which brings about disadvantages such as an increase in fuel consumption, reduction in engine power output, and an increase in exhaust gas emission.

As means for resolving these disadvantages, it is recommended that an operator adjust a fuel needle valve of a carburetor to control fuel in an optimum combust ion for each operation. However, high-level skill and specialised equipment are required for this adjustment.

As a conventional art for accurately and automatically carrying out adjustment of a carburetor, capable of responding adequately to changes in the using environment, for example, the method for operating internal combustion engine is disclosed in Patent Document (Japan Publication No. 2011-012685). In this conventional art, it is possible to accurately adjust an amount of fuel supply, and an engine rotational speed depends on a composition of fuel-air mixture, being adjusted in accordance with an operating curve. This is, the conventional art comprises, in order to set a desired composition of fuel-air mixture, a step of changing operating parameters (a composition of fuel-air mixture) until an operating point is positioned at a desired portion.

PRIOR ART DOCUMENT

Patent Document 1: Japan Publication No. 2011-012685

OBJECTS OF THE INVENTION

However, in the above-described conventional art, there are problems that it takes a relatively long time in order to stabilize an engine rotational speed, and a delay is caused in the control of the rotational speed due to rapid load change during an actual operation, which makes it impossible to supply a favorable fuel-air mixture.

Then, the present invention has been made in order to solve the problems in the above-described conventional art. Therefore, the object of the present invention is to bring the engine into an optimum combustion within an operating rotation range which is a high-rotation range in which an actual operation is performed by means of detecting an air-fuel ratio state of mixture to be supplied to the engine in an idling state prior to the actual operation so that a delay in the control does not occur.

SUMMARY OF THE INVENTION

A fuel control method for handheld engine operating machine of the present invention has a major technical feature including:

in combination of an engine and a carburetor attached to a handheld engine operating machine, the carburetor in which a solenoid valve which controls a fuel flow rate during engine operating time, and an idle jet which keeps a fuel flow rate to a constant value during engine idling time are provided in a fuel passage leading up to a carburetor measuring chamber and a throttle valve;

a step of carrying out a rotational speed detecting process of measuring a rotational speed of the engine during engine idling time after the engine is started up;

a step of carrying out an idle rotation, adjusting process of making a rotational speed detected by the rotational speed detecting process equal to a initial value of rotational speed among initial values determined according to results obtained by previous idle rotation adjusting process at the latest driving time of the engine by controlling an ignition timing while comparing the detected rotational speed with the initial value of rotational speed as target value; and determining an adjusted valve opening (A.V.O.) which is an opening of the solenoid valve during engine operating time determined by a valve opening correction process of making an optimum air-fuel ratio during engine operating time which is estimated from as idle ignition timing change (I.I.T.C.) which is a difference from the initial value of the ignition timing among the initial values obtained by the previous idle rotation adjusting process.

There is no load change during engine idling time because the clutch is disengaged. The fuel flow rate is constant by the idle jet as an air flow rate and the change in engine rotational speed is caused only by change of the surrounding environment.

The rotational speed detected by the rotational speed detecting process is compared with the predetermined initial value of rotational speed, being made equal to the initial value as target value by means of adjusting an ignition timing, and then, the ignition timing at the time when the detected rotational speed become equal to the initial value is set as an adjusted ignition timing. For example, in the case where the air-fuel (A/F) ratio is lean and the detected rotational speed is higher than the initial value of rotational speed, the ignition timing is delayed from the initial value of the ignition timing, in order to decrease the rotational speed. On the other hand, in the case where the A/F ratio is rich and the rotational speed is low, it is controlled such that the ignition timing is advanced from the initial value to increase the rotational speed.

By estimating an A/F ratio from an idle ignition timing change (I.I.T.C.) obtained by comparison of the adjusted ignition timing and the initial value of the ignition timing, it is possible to determine a valve opening at which an A/F ratio becomes optimum during engine operating time at a higher speed than idling time, in which the clutch is engaged. That is, by correcting an estimated air-fuel ratio of engine operating time in advance during engine idling time, it is possible to eliminate delay in control during engine operating time after engine idling time.

In this way, because an ignition timing is controlled with feedback of a rotational speed in a state in which a fuel flow rate is fixed constant during engine idling time, it is possible to perform the rotational speed control, with low electric power. And during engine operating time, it is possible to drive the engine so as to have an optimum A/F ratio without causing delay in control.

In another technical feature according to the present invention, the above-described fuel control method further comprises a step of determining a correction valve opening (C.V.O.) of the solenoid valve at each of the rotational speeds based on both of the idle ignition timing change (I.I.T.C.) obtained by the idle rotation adjusting process and rotational speed expected during engine operating time, and adjusting a valve opening during engine operating time by adding the correction valve opening (C.V.O.) to the adjusted valve opening (A.V.O.).

With the fuel control method to adjust a valve opening according to a rotational speed, it is possible to drive the engine at an optimum A/F ratio in any rotational speed range during engine operating time.

Further, in another technical feature according to the present invention, a temperature sensor which detects a temperature of the engine is provided in the above-described in combination of the engine and the carburetor, the fuel control method includes a step of determining an adjusted valve opening (A.V.O.) in a state in which a detection value is equal to or more than a predetermined threshold value of the temperature sensor.

With the fuel control method, to determine an adjusted valve opening (A.V.O.) in a state in which a detection value is equal to or more than the predetermined threshold value of the temperature sensor which detects a temperature of the engine, it is possible to accurately judge that the engine is brought into a warm-up condition due to the detection value of the temperature sensor being equal or more than the threshold value, thereby it is possible to promptly judge an accurate stable operating state of the engine. For example, an idle rotational speed is generally decreased on condition of cold engine, and it may happen that it is impossible to judge whether or not an A/F ratio is changed too rich. But, in the fuel control method according to the present invention it is possible to accurately judge this change in A/F ratio by the temperature sensor.

Further, in another technical feature according to the present invention, an indicator showing completion of the process of determining an adjusted valve opening (A.V.O.) is provided in the above-described major configuration.

With the fuel control method in which the indicator showing completion of the processing of determining an adjusted valve opening (A.V.O.) is provided, it is possible with this indicator to judge at a glance whether or not the handheld operating machine to be used has completed the valve opening correction process in accordance with the present invention.

EFFECT OF THE INVENTION

The present invention is arranged as described above, and therefore, the following effects are exerted.

With the configuration of the method according to the present invention, it is possible to perform rotational speed control with low electric power during engine idling time, and it is possible to drive the engine In a state of being adjusted to have an optimum air-fuel ratio during engine operating time. Therefore, a large-capacity generator or battery is not required, thereby it is possible to further obtain downsizing and weight saving. Further, because all processes needed during engine operating time is completed during engine idling time in advance, a time delay due to execution of the control during engine operating time is not caused, which makes it possible to obtain highly safe handling.

With the configuration in which an opening of the solenoid valve is composed of an adjusted valve opening and a correction valve opening determined according to a rotational speed and an idle ignition timing change, it is possible to drive the engine at an optimum air-fuel ratio in ail the speed ranges used during engine operating time, and therefore, it is possible to achieve output maximization and reduction in exhaust gas emission.

With the configuration to perform the processing of determining an adjusted valve opening in a state in which a detection value of the temperature sensor detecting a temperature of the engine is equal to or more than a predetermined threshold value, it is possible to promptly and accurately judge a stable combustion state of the engine, and therefore, it is possible to accurately and efficiently execute the valve opening correction process in accordance with the present invention.

With the configuration in which the indicator showing completion, of the processing of determining an adjusted valve opening is provided, it is possible with this indicator to judge at a glance whether or not the handheld engine operating machine to be used has completed the valve opening correction process in accordance with the present invention, and therefore, it is possible to reasonably and efficiently perform handling of the handheld engine operating machine.

BRIEF DESCRIPTION OF THE DRAWINGS

FIG. 2 is a simple explanatory diagram of a combination for implementing the present invention.

FIG. 6 is a graph showing the relationship between fuel flow rates and rotational speeds in connection with respective loads.

DESCRIPTION OF THE PREFERRED EMBODIMENTS

Hereinafter, an embodiment of the present invention will be described with reference to the drawings.

Figure 1:
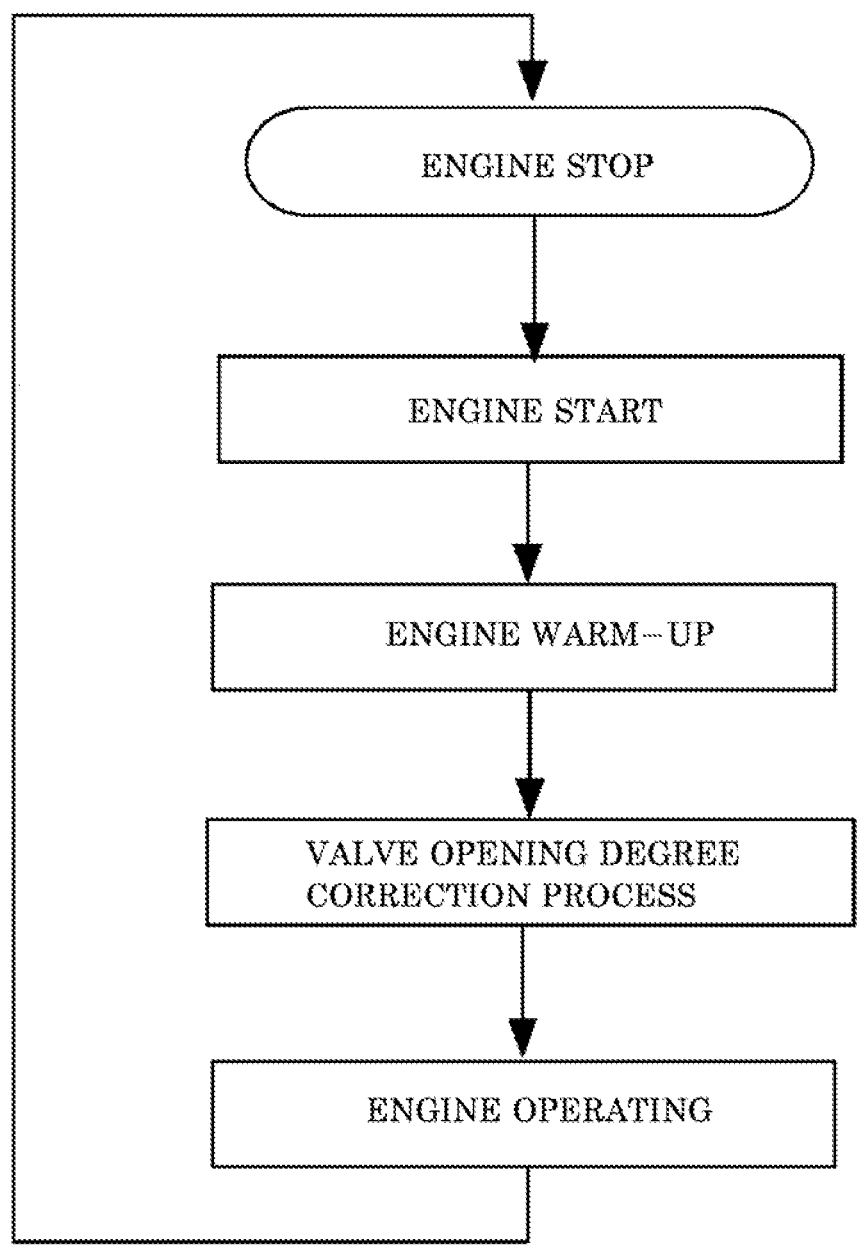
FIG. 1 is an explanatory diagram showing a basic engine operation flow of the present invention.

FIG. 1 shows a basic engine operation flow of the present invention. After starting up from engine stop, the engine warms up to be in a sufficiently stable state. At the sufficiently stable state, while the described-below rotational speed control is performed according to ignition timing during engine idling time, the described-below valve opening correct ion process is performed. In the process, as described later, the adjustment of valve opening and the correction of valve opening are performed based on the result of the rotational speed control. After the adjustment, the engine practically operates.

In FIG. 2, an engine 9 generates electric power for such devices as an ignition plug 10, a microcomputer in a control device 12, and a solenoid valve 5 by means of both a permanent magnet built in a flywheel 13 and a magnet coil in the control device 12. In addition, the microcomputer in the control device 12 detects a time per rotation, and stores respective data on rotational speed, ignition timing, and valve opening during one rotation of the engine 9.

A carburetor 1 comprises an idle jet 3 connected between a fuel, tank 7 and an idle hole 2, that makes a fuel, supply flow rate constant, and the solenoid valve 5 connected to a main nozzle 4, that carries out a decrease or increase in fuel according to a valve driving signal t from the control device 12. The idle jet 3 and the solenoid valve 5 are connected to a fuel tank 7 via a fuel passage 8. In addition, reference numeral 6 is a throttle valve, and a mixture of air-fuel k which is produced by this carburetor 1 is supplied into a cylinder of the engine 9.

The control device 12A comprises a temperature sensor 14 which, detects a temperature of the engine 9, and an indicator 15 using an LED which is an example of means for indicating that the valve opening (V.O.) correction process according to the present invention is completed. In this embodiment shown in FIG. 1, it is possible to detect highly, precisely, and efficiently a rotational speed (averaged rotational speed) during engine idling time in a stable warm-up state which can be detected by the temperature sensor 14, and it is possible to clearly and accurately recognize the completion of the V.O. correction process in accordance with the present invention with lighting indication of the indicator 15, thereby it is possible to obtain safe and inerrable handling.

Figure 3:
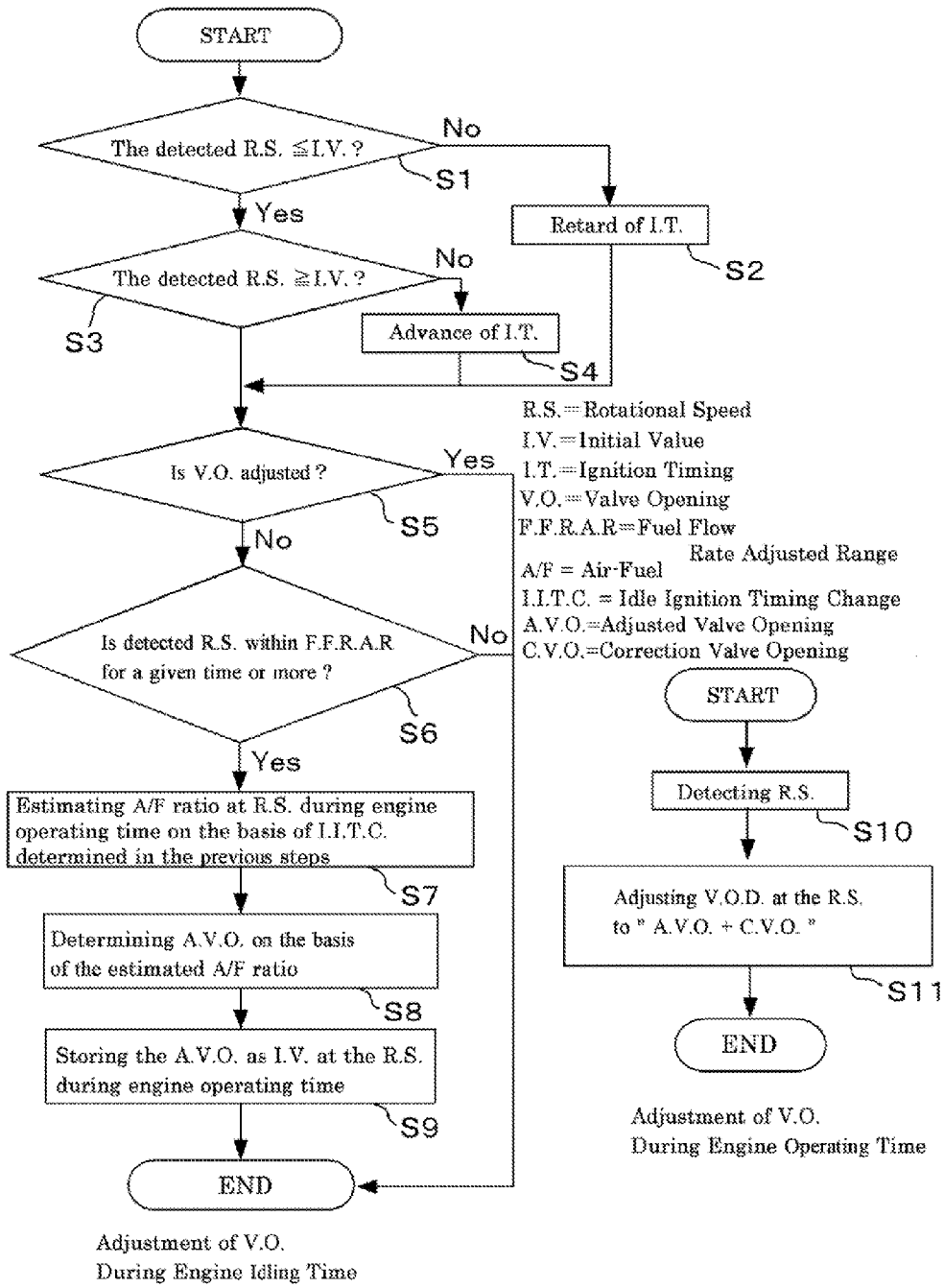
FIG. 3 is a flow diagram showing a control algorithm of an embodiment of the present invention.

FIG. 3 shows a control algorithm per rotation of the microcomputer of the control device 12 in a fuel adjustment operation during engine idling time and a valve opening adjusting operation during engine operating time. In the fuel adjustment operation during engine idling time, when the engine is in an idle state after starting, a measured rotational speed is compared with an initial value of rotational speed as target value in steps S1 and S3, and the ignition timing is changed in steps S2 and S4 according to the result of the comparison. In step S5, it is judged whether or not the valve opening is an adjusted valve opening ("A.V.O.D"), and if it is an "A.V.O.", the flow ends. That is, in the case where the valve opening has been already adjusted, only rotational speed stabilization according to ignition timing is carried out during engine idling time.

In the case where the valve opening is not yet an "A.V.O.", in step S6, it is judged whether the engine is operating within the fuel flow rate adjusted range ("F.F.R.A.R.") in which the detected rotational speed can foe considered to be in a stable idle rotational speed range centering the initial value of rotational speed as target value daring a given period or a given number of rotation. When it is within the F.F.R.A.R., in step S7, a current air-fuel, ratio is estimated from the idle ignition timing change ("I.I.T.C.") at that time on the basis of the relationship in FIG. 4. In step S8, on the basis of the estimated air-fuel ratio is determined the "A.V.O." that is a solenoid valve opening so as to make an adequate fuel flow rate at the rotational speed during the engine operating time in which a clutch is engaged to operate machine, and in step S9, the "A.V.O." is stored and set as an initial value of valve opening at the next start of engine operating time. At this time, the ignition timing and rotational speed as well are stored and set as an initial value of the ignition timing and rotational speed, respectively.

In the adjustment of the valve opening during engine operating time, when the throttle valve 6 is opened to reach an operating rotational speed range, an amount of air and a fuel flow rate are increased, and electric power as well is increased, which makes it possible to operate the solenoid valve 5. However, the microcomputer in the control device 12 detects a rotational speed in step S10, and a valve opening ("V.O.") of the solenoid valve 5 is set to such an V.O. as is obtained by adding the "A.V.O." determined in step S8 to a correction valve opening ("C.V.O.") determined by the relationship of FIG. 5 according to a rotational speed and an idle ignition timing change.

Figure 5:
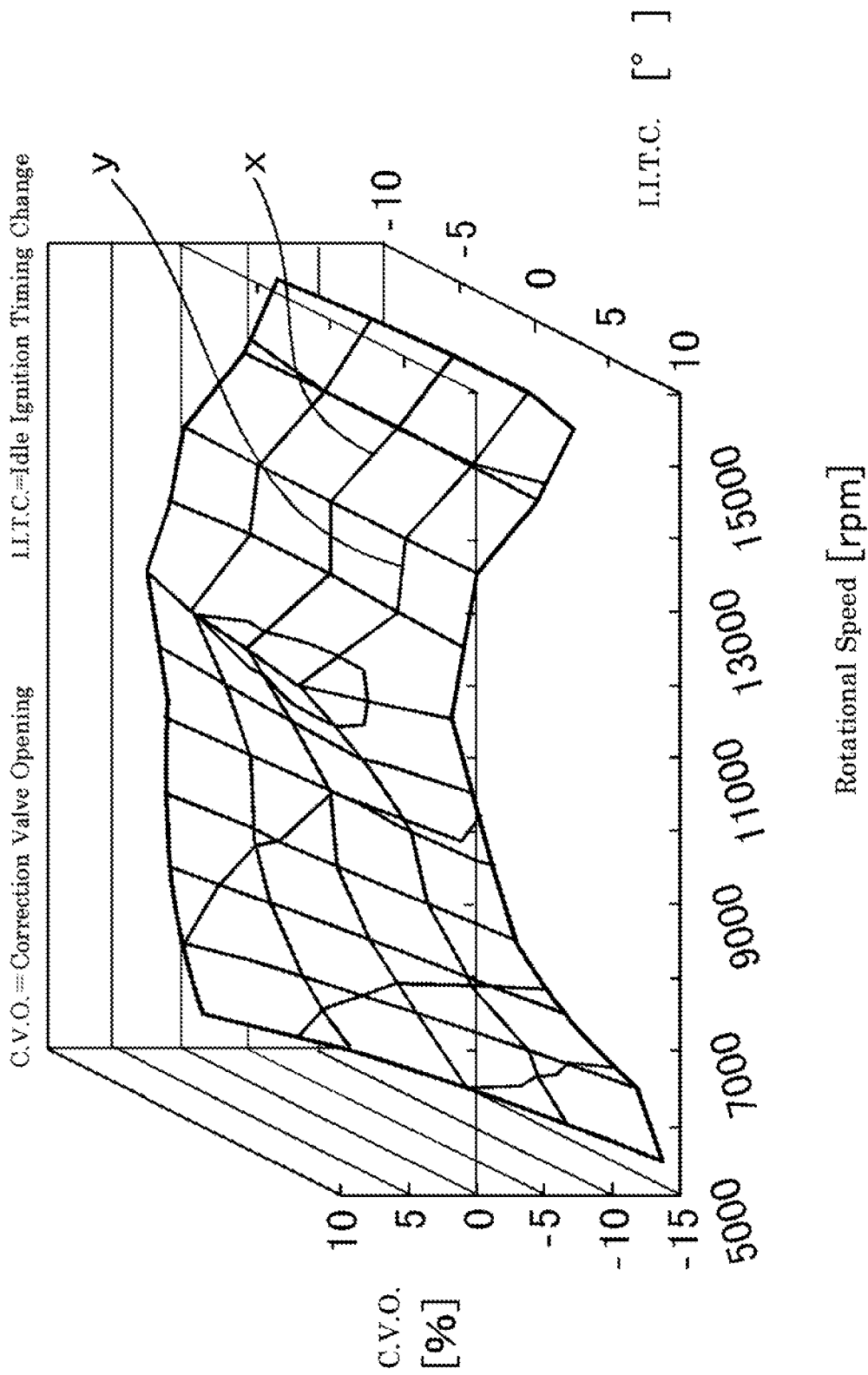
FIG. 5 is a three-dimensional graph for determining a correction valve opening according to an idle ignition timing change and a rotational speed.

That is, the opening of the solenoid valve 5 is adjusted according to a "C.V.O." graph shown in FIG. 5 so as to have an optimum air-fuel ratio in a desired rotational speed range during engine operating time.

Figure 4:
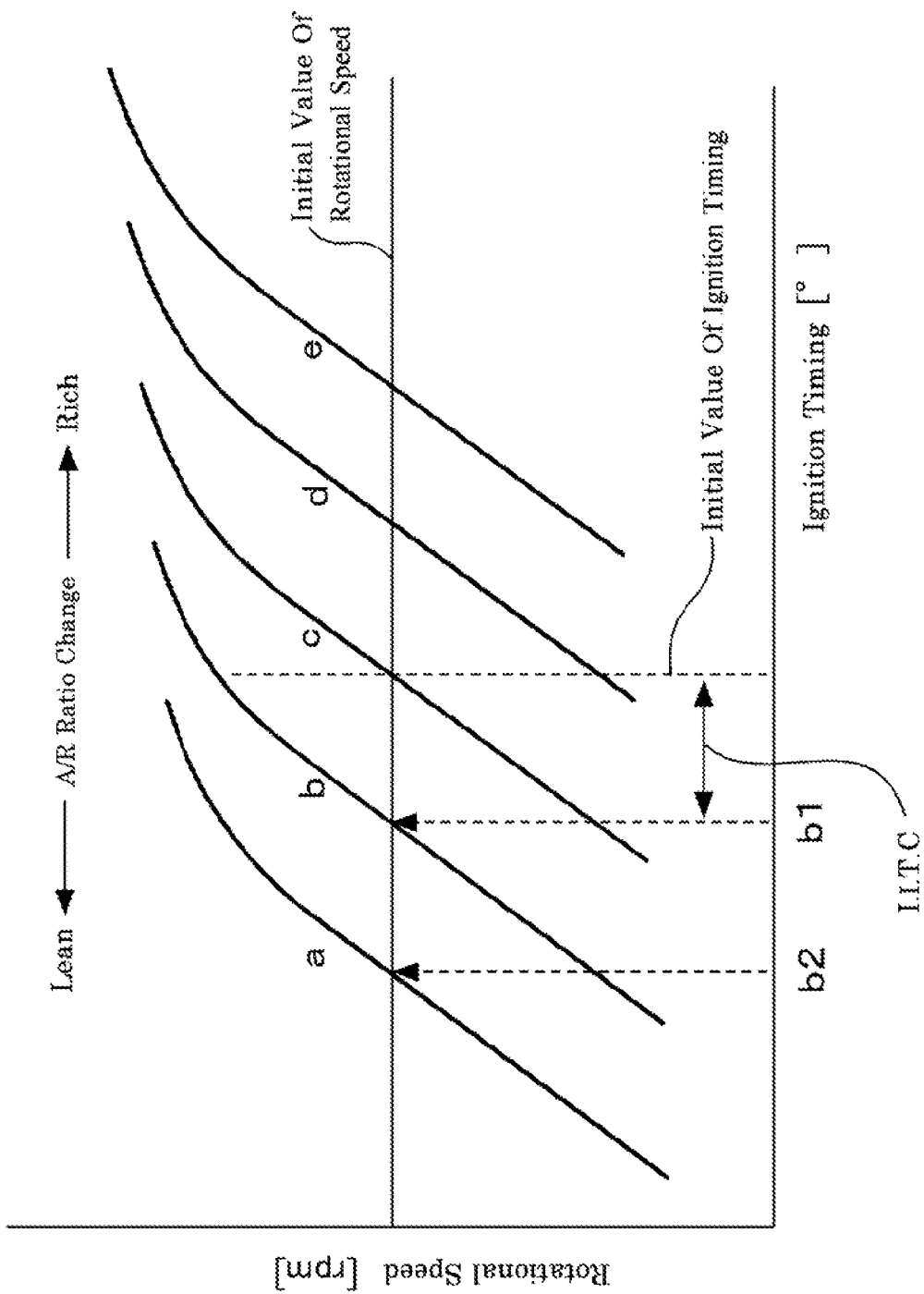
FIG. 4 is a graph showing the relationship between ignition timing and rotational speed in idling in connection with air-fuel ratio.

FIG. 4 is a diagrammatic drawing showing the relationship between ignition timing and engine rotational speed during engine idling time in the case where an air-fuel ("A/F") ratio of mixture gas to be supplied is changed toward rich or lean due to changes of the surrounding environment. In the case where a detected rotational speed is lower than the initial value of rotational speed, as target value, and is positioned on the A/F characteristic curve "d" at the position of the initial value of the ignition timing, the A/F characteristic curve of the engine moved from the curve "c" to the curve "d", and consequently, the A/F ratio is changed in the rich direction. That is, the rotational speed is decreased in the initial value of the ignition timing. In contrast, in the case where the detected rotational speed is higher than the initial value of rotational speed, and is positioned on the A/F characteristic curve "b" at the position of the initial value of the ignition timing, the A/F characteristic curve of the engine moved from the curve "c" to the curve "b", and consequently, the A/F ratio is changed in the lean direction. That is, the rotational speed is increased in the initial value of the ignition timing. In this way, it is possible to detect change in A/F ratio from a rotational speed at the initial value of the ignition timing.

According to the present invention, by controlling an ignition timing during engine idling time, it is possible to adjust a changed (shifted) rotational speed to the predetermined initial value as target value, and it is possible to estimate (presume) a shift in A/F ratio of the engine according to the idle ignition timing change ("I.I.T.C.") that is a degree by which the ignition timing is changed from the initial value of the ignition timing for the above-mentioned adjustment with the rotational speed. That is, the ignition timing change "b2" is in a state of lean A/F ratio than the ignition timing change "b1".

FIG. 5 shows the graph for determining a "C.V.O." of the solenoid valve from "I.I.T.C." obtained by idle rotation adjustment process in the steps S1-S4, at respective high-rotational speed ranges in which operations are expected to be performed. As shown in FIG. 5, when the adjustment with idle rotational speed is completed in the initial value of the ignition timing as is because there is no change in A/F ratio, the idle ignition timing change is 0 (zero) and the "C.V.O." curve "x" at the ignition timing change corresponds to the initial values according to the latest valve opening correction process. The "C.V.O." in this curve "x" generally differs according to each rotational speed, and therefore, the different correction valve opening is generally obtained when the detected rotational speeds are different from each other.

As is clear from the graph data shown in FIG. 5, at a specific rotational speed (13000 rpm in this graph), the correction valve opening is 0 (zero)%, that is, the valve opening is equal to the "A.V.O.". In the case where the rotational speed is changed from the specific rotational speed to, for example, 10000 rpm due to change in load or the like, when the idle ignition timing change is 5°, the "C.V.O." curve becomes the curve "y", and therefore, the "C.V.O." becomes approximately 3%. In this way, according to the data shown in FIG. 5, it is possible to drive the engine at an optimum A/F ratio in ail of the operating rotation ranges, which makes it possible to achieve high engine power and reduction of harmful substances in exhaust gas emission.

FIG. 6 shows the relationship between rotational speed and fuel flow rate in connection with the levels of loads, on three cases: (1) the case of "Conventional Carburetor" denoted by rhombic mark, where no adjustments of the present invention are applied; (2) the case of "Carburetor With A.V.O." denoted by square mark, where only the process in accordance with the "A.V.O." is applied to the carburetor; and (3) the case of "Carburetor With A.V.O.+C.V.O." denoted by round mark, where the processes in accordance with both of the "A. V.O." and "C.V.O." are applied to the carburetor. The case of "Carburetor With A.V.O." in FIG. 6 shows that it is possible to reduce fuel consumption within the operating rotational speed range and consequently to bring engine combustion state into a good state with respect to nigh engine power. On the other hand, the case of "Conventional Carburetor" shows that the fuel flow rate is increased. Further, the case of "Carburetor with A.V.O.+C.V.O." shows that it is possible to drive the engine at a fuel flow rate so as to produce high output even if the load is changed and that it is possible to drive the engine at an optimum air-fuel ratio in the entire operating range.

An actual simple operation, example in accordance with the present invention will foe described hereinafter. With an idling range from 2000 to 4200 rpm, rotational speed feedback control is carried out during this engine idling time. With an initial value of rotational speed as target value set to 3000 rpm, when the detected rotational speed is 3000 rpm or less, the ignition timing is made to be advanced in order to keep the detected rotational speed equal to the initial value of rotational speed. On the other hand, when the detected rotational speed is 3000 rpm or more, the ignition timing is made to be retarded. When the rotational speed stays for ten seconds in the "F.F.F.A.R." which is a range of 200 rpm from the initial value of rotational speed, the optimum valve opening is set in accordance with the "C.V.O." curve of FIG. 5 from the ignition timing change at that time.

INDUSTRIAL APPLICABILITY

As described, above, the control method for handheld engine operating machine of the present invention is arranged to complete all adjustments/settings necessary for the valve opening of the solenoid valve during engine idling time. In the result, there is no delay in control and it is possible to reliably obtain safe handling of the operating machine. And therefore, the handheld engine operating machine is expected to be widely used and developed in the utilization field of handheld engine operating machines strongly required for safety.

DESCRIPTION OF REFERENCE NUMERALS

1: Carburetor
2: Idle hole
3: Idle jet
4: Main nozzle
5: Solenoid valve
6: Throttle valve
7: Fuel tank
8: Fuel passage
9: Engine
10: Spark plug
11: Ignition device
12: Control device
13: Flywheel
14: Temperature sensor
15: Indicator
k: air-fuel mixture
t: Valve driving signal

We claim:

1. A fuel control method for handheld engine operating machine, in an engine with a carburetor in which a solenoid valve which controls a fuel flow rate during engine operating time and an idle jet which keeps a fuel flow rate to a constant value during an engine idling time are provided in a fuel passage communicating to a carburetor measuring chamber and a throttle valve respectively, the fuel control method comprising steps of:
   carrying out a rotational speed detecting process of measuring a rotational speed of the engine during engine idling time after the engine is started up;
   carrying out an idle rotation adjusting process of making a rotational speed detected by the rotational speed detecting process equal to an initial value of rotational speed among initial values determined according to results obtained by previous idle rotation adjusting process at the latest driving time of the engine by controlling an ignition timing while comparing the detected rotational speed with the initial value of rotational speed as target value; and
   determining an adjusted valve opening (A.V.O.) which is an opening of the solenoid valve during engine operating time determined by a valve opening correction process of making an optimum air-fuel (A/F) ratio during engine operating time which is estimated from an idle ignition timing change (I.I.T.C.) which is a difference from the initial value of the ignition timing among the initial values obtained by the previous idle rotation adjusting process.

2. The fuel control method for handheld engine operating machine according to claim 1, further comprising a step of determining a correction valve opening (C.V.O.) of the solenoid valve at each of the rotational speeds based on both of the idle ignition timing change (I.I.T.C.) obtained by the idle rotation adjusting process and the rotational speed expected during engine operating time, and adjusting a valve opening during engine operating time by adding the correction valve opening (C.V.O.) to the adjusted valve opening (A.V.O.).

3. The control method for handheld engine operating machine according to claim 1, wherein a temperature sensor which detects a temperature of the engine is provided and the adjusted valve opening (A.V.O.) is determined after a detection value of the temperature sensor is equal to or more than a predetermined threshold value.

4. The control method for handheld engine operating machine according to claim 1, wherein an indicator showing completion of the step of determining the adjusted valve opening (A.V.O.) is provided.

5. The control method for handheld engine operating machine according to claim 2, wherein a temperature sensor which detects a temperature of the engine is provided and the adjusted valve opening (A.V.O.) is determined after a detection value of the temperature sensor is equal to or more than a predetermined threshold value.

6. The control method for handheld engine operating machine according to claim 2, wherein an indicator showing completion of the step of determining the adjusted valve opening (A.V.O.) is provided.

7. The control method for handheld engine operating machine according to claim 3, wherein an indicator showing completion of the step of determining the adjusted valve opening (A.V.O.) is provided.

8. The control method for handheld engine operating machine according to claim 5, wherein an indicator showing completion of the step of determining the adjusted valve opening (A.V.O.) is provided.

* * * * *